(12) United States Patent
Ackerman et al.

(10) Patent No.: US 7,680,742 B1
(45) Date of Patent: Mar. 16, 2010

(54) SYSTEM AND METHOD FOR CONTROLLING ACCESS TO LICENSED COMPUTING PROCESSES VIA A CODIFIED ELECTRONIC LICENSE

(75) Inventors: Mark D. Ackerman, Eagle Mountain, UT (US); Stephen R Carter, Spanish Fork, UT (US)

(73) Assignee: Novell, Inc., Provo, UT (US)

( * ) Notice: Subject to any disclaimer, the term of this patent is extended or adjusted under 35 U.S.C. 154(b) by 1550 days.

(21) Appl. No.: 09/973,664

(22) Filed: Oct. 9, 2001

(51) Int. Cl.
*G06Q 99/00* (2006.01)

(52) U.S. Cl. .................. 705/59; 713/167; 717/177; 717/178

(58) Field of Classification Search ............... 717/168, 717/103, 174, 177; 705/50–59, 64; 380/232, 380/201, 202; 707/104, 4; 713/167; 709/226
See application file for complete search history.

(56) References Cited

U.S. PATENT DOCUMENTS

| | | | |
|---|---|---|---|
| 5,138,712 A | | 8/1992 | Corbin |
| 5,553,143 A | * | 9/1996 | Ross et al. ................. 705/59 |
| 6,078,909 A | | 6/2000 | Knutson |
| 6,188,995 B1 | * | 2/2001 | Garst et al. ................. 705/59 |
| 6,189,146 B1 | * | 2/2001 | Misra et al. ............... 717/177 |
| 6,219,652 B1 | * | 4/2001 | Carter et al. ................ 705/59 |
| 7,203,703 B2 | * | 4/2007 | Clement et al. ........... 707/104.1 |
| 2001/0010046 A1 | * | 7/2001 | Muyres et al. ................. 705/52 |
| 2001/0013099 A1 | * | 8/2001 | Haruki ........................ 713/202 |
| 2002/0107809 A1 | * | 8/2002 | Biddle et al. .................. 705/59 |
| 2002/0123992 A1 | * | 9/2002 | Goldick ......................... 707/4 |

FOREIGN PATENT DOCUMENTS

EP 778512 A2 * 6/1997

OTHER PUBLICATIONS

Donald J. Bagert, Taking the Lead in Licensing Software Engineers, Apr. 1999, Communications of the ACM, vol. 42, No. 4, pp. 27-29.*
Erwin Schoitsch, Software Proceses, assessment and ISO 9000-certification: A user's view,1996, Elsevier Science B.V., Journal of Systems architecture, 42, 653-661.*
Volera Secure Excelerator, Technical Overview, Feb. 6, 2001, pp. 2-4.

* cited by examiner

*Primary Examiner*—Behrang Badii
(74) *Attorney, Agent, or Firm*—Schwegman, Lundberg & Woessner, P.A.

(57) ABSTRACT

A system and method controls access to hardware and software functions by employing a codified electronic license that does not generally require application code modification. In response to customer purchases, highly configurable XML licenses containing lists of allowable CLI commands are generated, digitally signed, and transmitted to various customer systems over a network. The customer systems authenticate the licenses, extract the CLI command lists, and register the specified commands with a command processor internal to the customers' systems. Only registered commands are allowed to execute, preventing unlicensed hardware and software from operating on the system.

7 Claims, 7 Drawing Sheets

SYSTEM AND METHOD FOR CONTROLLING ACCESS TO LICENSED COMPUTING PROCESSES VIA A CODIFIED ELECTRONIC LICENSE

BACKGROUND OF THE INVENTION

1. Field of the Invention

This invention relates to systems and methods for licensing software and hardware in a computing system.

2. Background Information

As computing systems add significant numbers of functions, customers may find that they have need for less than the entire number of functions offered by system vendors. It is desirable for vendors seeking to market large software and hardware products to an increasingly diverse base of customers—and customers who may desire a less-expensive (and more-limited function) version of a system—to selectively license only portions of the total system package.

In the area of proxy caching, where one or more servers are provided to accelerate web content loading, it is common to market a variety of services and functional components in a single hardware/software system. In such a system, the server hardware may consist of a one or more single or multi-processor computers, with customizable amounts of memory, hard disk storage, and other system resources to meet the customer's requirements. The servers may be arranged in a variety of configurations, including standalone caches or caching clusters (where multiple servers are interconnected and work cooperatively).

Furthermore, in such caching systems, caching software may offer a variety of services and caching configurations. Forward Proxy caching allows browsers to send requests for web content directly to a caching server, the caching server in which case obtains copies of the content and forwards it back to the browsers. Transparent Proxy caching allows a caching server to intercept browser requests, obtain the requested content, and return this content to the browsers without browser reconfiguration. Origin to Web Server Acceleration ("reverse proxy" caching) provides content request handling of requests originally targeted to a web server, serving these requests from data stored in the caching server. Other services may include media acceleration, activity logging, and customized network security solutions. Each service may or may not be desirable to a particular customer depending on the customer's individual needs.

While it is desirable for a vendor with a diverse base of clients to market a variety of systems (with different combinations of the above-mentioned hardware and software capabilities), the large number of possible combinations may make this flexibility cost-prohibitive. The expense increases because, traditionally, each combination is configured and often licensed differently.

Similarly, customers may find that they have need for more performance or functionality than is offered by their currently installed system. It is desirable for vendors seeking to offer upgrades to their software and hardware products to provide a mechanism where additional portions of the total system package—and thus additional performance and/or functionality—can be licensed and made available in a quick and easy-to-implement manner, either by activating an already-loaded functional module or enabling download and/or installation of one or more new functional modules.

In the area of proxy caching, such an upgrade may take the form of licensing additional hardware resources (for example, additional processors to increase computational power), or licensing an additional piece of software (for example, a media accelerator). Traditionally, this upgrade would require extensive reconfiguration, especially when the change affects third party products on the same system. As such, incremental upgrades may, again, become cost-prohibitive.

It is, therefore, desirable to provide a system and method for controlling access to software and hardware products with electronic licenses such that functionality and performance can be easily customized and/or upgraded.

SUMMARY OF THE INVENTION

The present invention overcomes the disadvantages of the prior art by providing a system and a method for controlling a server's (computer's) access to external software and hardware processes or functions through a codified licensing system. The invention allows selected features to be "unlocked" on the customer's computer system through a novel licensing technique. This technique generally involves allowing only selected software commands—commands used by licensed software (external) processes, or implemented with licensed hardware resources—to execute. This invention allows vendors to ship a standardized proxy cache server (a computer system configured to offer caching functions) to customers, while permitting use of only certain desired features. The system further allows customers to conduct an over-the-wire (network-based) upgrade when they desire additional features. Customers can select levels of hardware support such as the number of processors, system memory, or other components (including non-hardware items such data flow bandwidth). They can also select various software processes such as forward proxy caching, transparent proxy caching, reverse proxy caching, media acceleration, etc.

According to one embodiment of this invention, the licensing technique uses licenses written in Extensible Markup Language (XML) code to store license data. The XML-coded licenses contain a wide variety of data fields to specify such relevant license information as: package name, version, memory licensed, processors licensed, serial number, etc. Significantly, an XML codified set of "command directives" is used to provide the information needed to accept or reject software command registration by the server. In particular, these licenses contain fields that specify, through inclusion and exclusion statements, a list of Command Line Interface (CLI) commands that a CLI internal to the customer's server may register.

The server's command processor, which executes commands that are entered through the CLI, is adapted to execute only registered (e.g. licensed) commands. Software processes that contain unregistered commands fail to complete and using conventional processes are represented as unavailable for use/execution. Since most processes use at least one unique CLI command, by only registering the commands used in licensed processes, the server can be customized to offer specific functionality. In this manner, hardware and software licensing is enforced on a low level, requiring no modification of application code.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
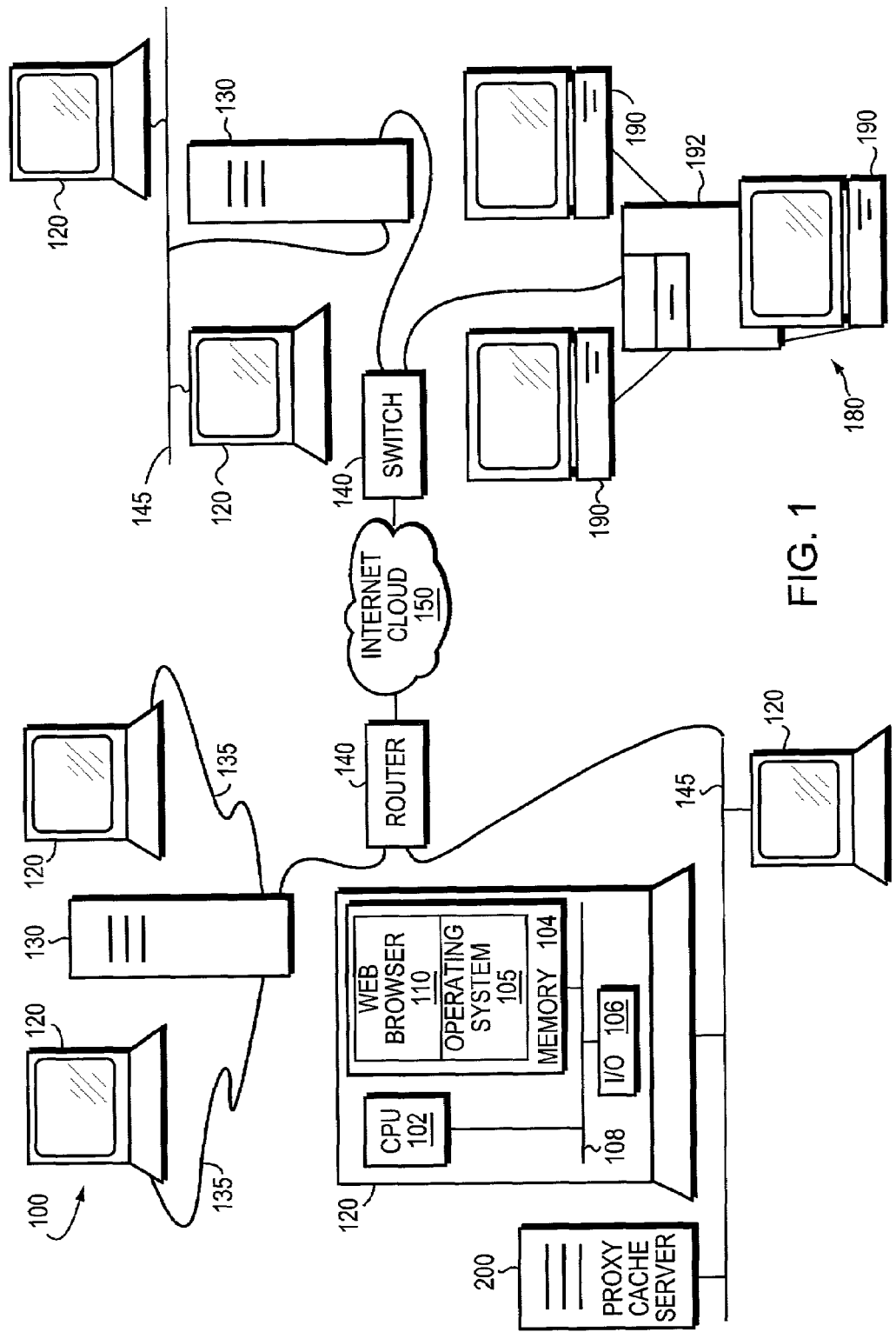
FIG. 1 is a block diagram of a computer inter-network including a collection of network segments connected to a plurality of client and server computers, the latter of which may be organized as a service provider and/or a networked proxy cache server.

FIG. 1 is a schematic block diagram of a computer inter-network 100 comprising a collection of network segments connected to a plurality of generalized computers 120 and servers 130, 190, 192 and 200, as well as a router 140 and switch unit 142. Each computer generally comprises a central processing unit (CPU) 102, a memory 104, and an input/output (I/O) unit 106 interconnected by a system bus 108. The memory 104 may comprise storage locations, typically composed of random access memory (RAM) devices that are addressable by the CPU 102 and I/O unit 106. An operating system 105, portions of which are typically resident in memory and executed by CPU, functionally organizes the computer by, inter alia, invoking network operations in support of application programs executing on the CPU. An example of such an application program is a web browser 110, such as the Netscape® browser available from Netscape Communications Corporation.

The network segments may comprise local area networks (LANs) 145 or intra-nets, point-to-point links 135 and the well-known Internet 150. Collectively, the segments are interconnected by intermediate stations, such as a network switch 142 or a router 140, and configured to form an inter-network of computers that communicate by exchanging data packets according to a predefined set of protocols, such as the Transmission Control Protocol/Internet Protocol (TCP/IP). It should be noted that other techniques/protocols, such as Internet Packet Exchange (IPX) protocol and the Hypertext Transfer Protocol (HTTP), might be advantageously used.

In the illustrative embodiment, the inter-network 100 is organized in accordance with a client/server architecture wherein computers 120 are personal computers or workstations configured as clients for interaction with users, and the computers 130, 190 and 192 are configured as servers that perform services as directed by the clients. For example, the servers 190 may be configured as a group to operate as a service provider (e.g., the "web site" 180), and as such, can be coordinated by a load-balancing server 192. As described further herein, and the servers 130 may be configured as domain name system (DNS) servers and/or Internet provider servers. In general, the DNS servers provide the clients 120, origin servers, and proxies with the network (e.g., IP) address (es) to of requested services in response to packets directed to the domain names for those services. The Internet providers, on the other hand, provide Internet access to the clients via, e.g., dial-up telephone lines or cable links.

The client 120 may utilize the web browser 110 to gain access to the web site 180 and to navigate, view or retrieve services stored on the servers 190 (hereinafter "web servers"). In order to effectively speed-up access to the service provider and reduce the retrieval time for stored services, one or more web servers may be associated with one or more proxy cache servers 200. While the proxy cache and web server functions can be combined in a single server, it is more common to divide the web server and proxy caching component and interconnect them via the local area network (LAN), or other dedicated connections there between. One web server can be associated with a plurality of proxy cache servers. Alternatively, a single proxy cache can be a reverse proxy for many web servers.

Figure 2:
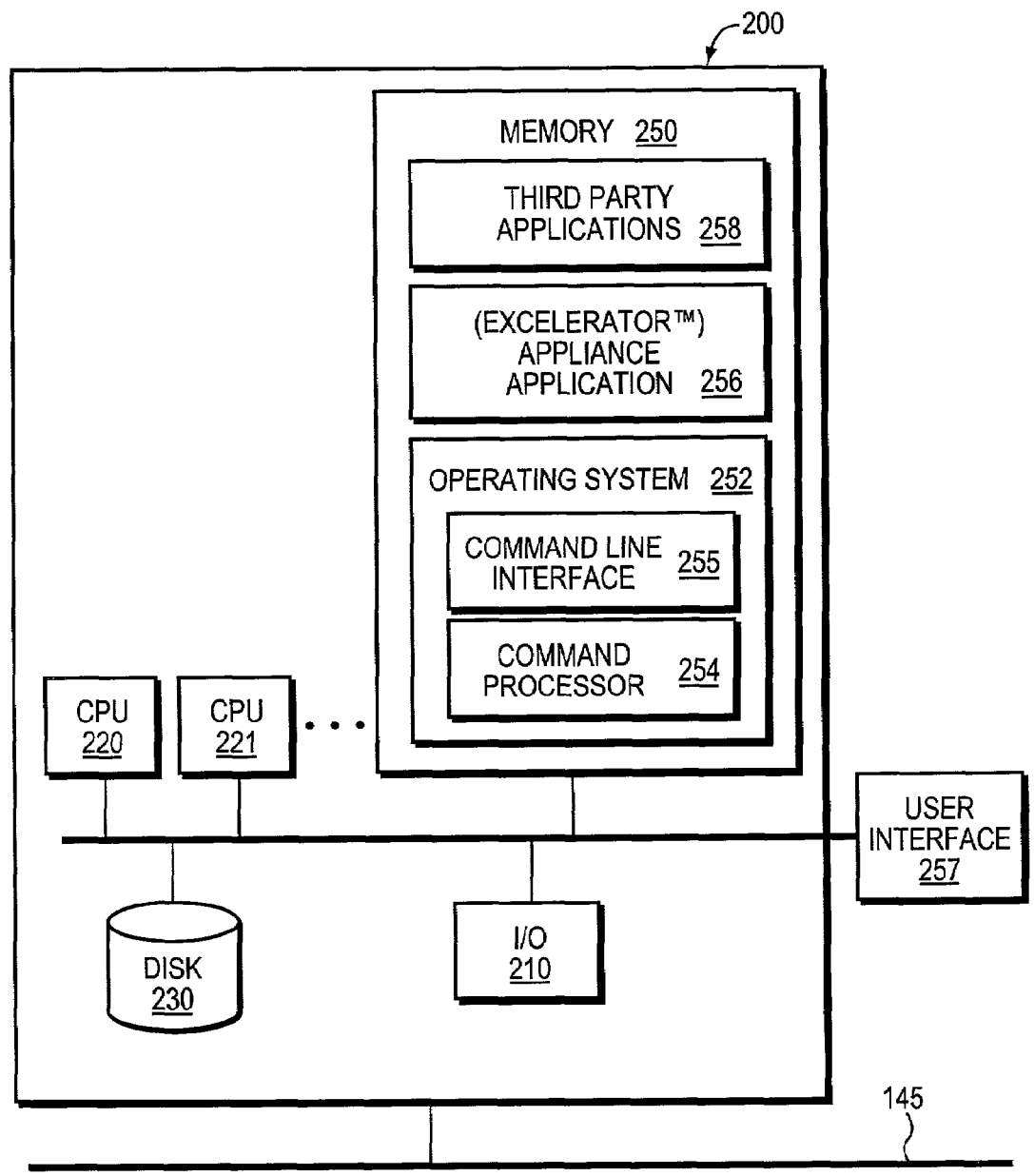
FIG. 2 is a block diagram of a proxy cache server connected to a network, showing both hardware and software components.

FIG. 2 is a block diagram of a proxy cache server 200 or appliance connected to a network 145, showing both hardware and software components. A proxy cache server generally comprises one or more CPUs 220, 221, a memory 250, a hard disk 230, and an input/output unit 210 (for example, a network interface card (NIC)). The CPUs may be advantageously arranged in a multiprocessing (MP) or symmetric multiprocessing (SMP) configuration where two or more processors are connected via a bus 240, each processor having equal access to I/O 210 and storage devices 230, 250. The memory 250 may comprise RAM, which is addressable by the CPUs 220, 221 and by the I/O unit 210. An operating system 252, portions of which are typically stored on the disk 230 and other portions of which are typically resident in memory 250, functionally organizes the computer and supports application programs. The operating system further contains a command processor 254, which interprets and executes commands entered by a command line interface (CLI) 255, or via a graphical user interface (GUI) and its associated drivers 257. The command processor directs commands towards specific hardware components (for example, directing a command to a specific processor) and to limit the amount of system resources (also termed "hardware resources") within various system components (for example limiting the amount of available memory or hard disk space used). Appliance application programs 256, such as the Excelerator™ available from Volera, Inc. of San Jose, Calif., and third party applications 258, are also stored in memory 250 and are invoked on the CPU's 220, 221 with support from the operating system 252.

Figure 3:
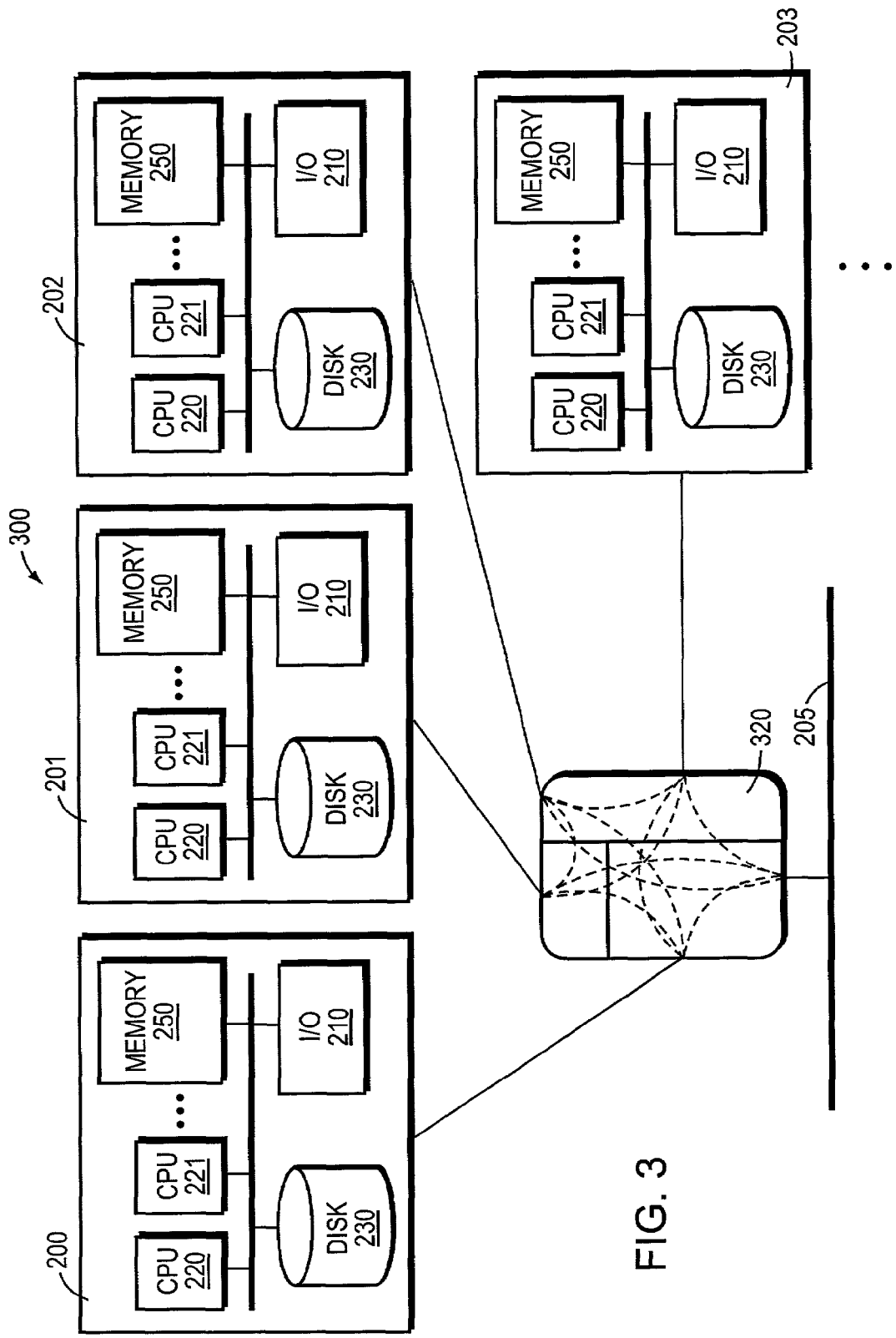
FIG. 3 is a block diagram of a plurality of proxy cache servers interconnected by a switching arrangement on a computer network for use advantageously with the teachings to of this invention.

FIG. 3 is a more-generalized block diagram of a proxy cache server cluster 300 connected to a network 205. Such a cluster generally comprises two or more proxy cache servers 200, 201, 202, 203 interconnected through a switch 320. The servers intercommunicate to handle incoming cache requests using a variety of cooperative processing methods. Such a cluster configuration can be advantageously employed to provide load balancing of cache resources, where caches that receive a large number of data requests forward or otherwise assign these requests to a more-lightly loaded cache. Further, this type of arrangement can provide fail-over support in the event of server failure whereby functioning cache servers dynamically assume the roles of failed machines.

Figure 4:
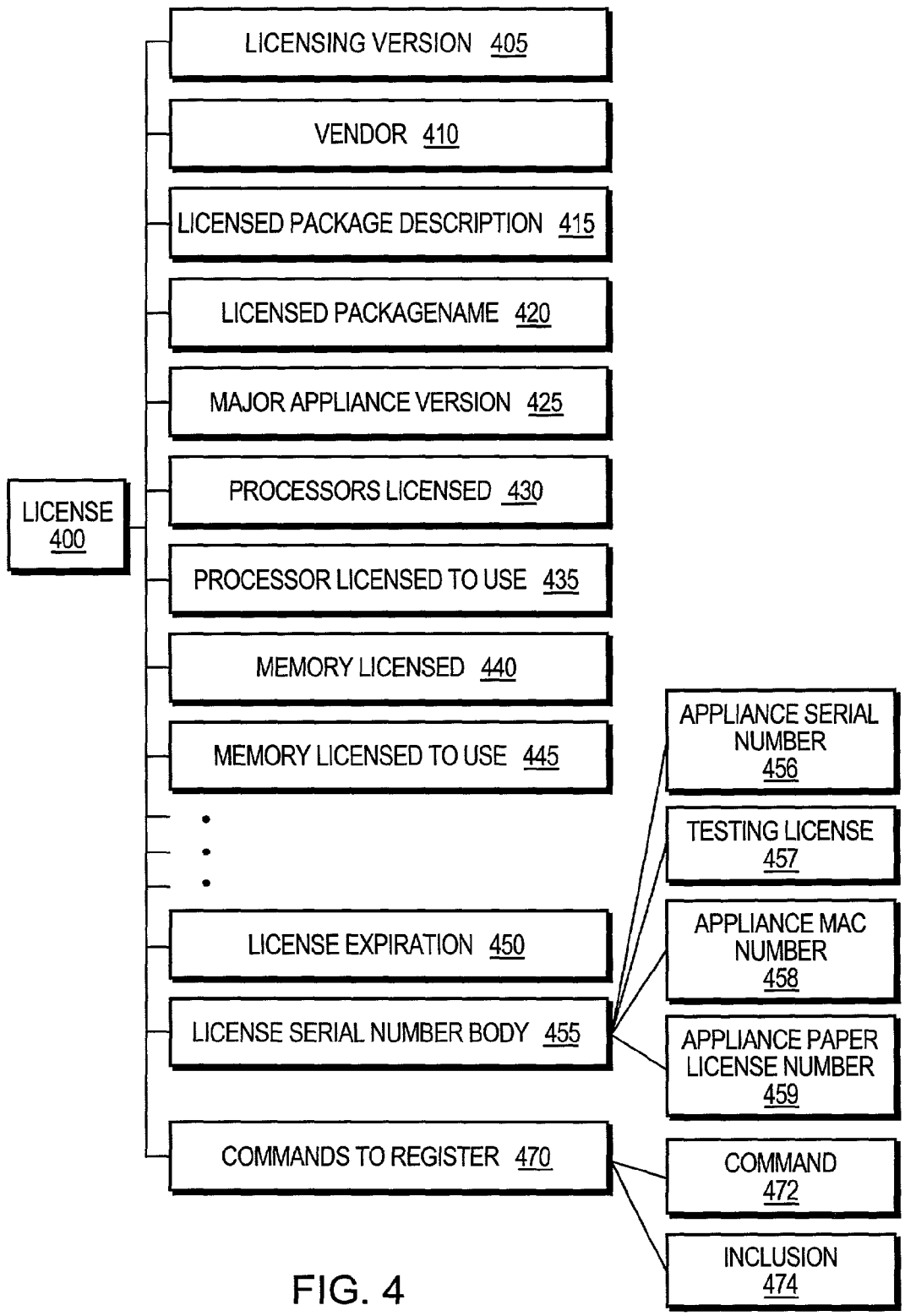
FIG. 4 is a highly schematized block diagram of the data structure of a license for use according to an embodiment of this invention.

FIG. 4 is a schematic block diagram of an illustrative embodiment of a license 400 to for use in accordance with this invention. In this embodiment, the license is coded in Extensible Markup Language (XML), a specification developed by the World Wide Web Consortium (WWWC). XML is a series of rules and conventions for structuring data in a text file in an unambiguous and platform independent manner. However, it is expressly contemplated that other languages and formats can be employed. XML extensively makes use of tags—markers in the document that indicate the beginning or the end of data. Further, XML documents are generated by reference to an XML schema, a framework or template, specific to the type of document. The XML schema defines a set of data types such as numbers, dates, and strings, as well as the overall data organization and format.

The license 400 contains a number of formatted data fields. A License Version field 405, indicates the design iteration of the license itself. The field consists of two strings, a major version string (not shown) that holds the numerical value of the last major revision of the license, and a minor version string (not shown) that holds a numerical value indicating a more minor revision.

A Vendor field 410 indicates the source of the license. The field holds a text string indicating the name of the organization issuing the license (for example, the manufacturer or an OEM).

A Licensed Package Description field 415 holds a text string indicating the type of license that is issued. It is desirable to have a variety of license types to fulfill various roles. OEM manufacturing licenses are used by OEM's during the manufacturing process. These licenses usually do not have a serial number, allowing the OEM to to produce a number of end-user software installation (typically removable) media (software CD-ROMs, for example) from a single license. OEM Add-on Manufacturing Licenses are used by OEM's to license additional features of the proxy cache, and similarly, usually do not contain serial numbers. OEM demonstration licenses are used by OEM's to demo proxy cache and add-on functions to prospective buyers. This type of license often has an expiration date. OEM testing licenses are used by OEM's for in-house testing of the system and similarly usually have an expiration date. Beta licenses are used by beta testers to test the system under real world conditions. Such licenses generally expire after a period of time. Appliance licenses are the type of license usually issued to end-users who purchase a proxy cache server. There is no expiration date, but these licenses generally carry a unique serial number to prevent duplication. Similarly add-on Licenses, with serial numbers, are issued to end users who purchase additional features.

A License Package Name field 420 provides storage for a text string describing the product the end user has bought. Values may describe a forward proxy cache, reverse proxy cache, etc.

A Valid Major Appliance Version field 425 specifies the major version of the product that can be licensed via the license document. For instance, the value may be "2" in which case only version 2 of the proxy cache (including, for instance, sub-versions 2.0, 2.1, 2.2 etc.) is valid. If the proxy cache is upgraded to, for example, version 3.0, then new licenses must be obtained or the existing licenses must be upgraded.

As previously stated, it may be desirable to license various levels of use of system to resources. Two of the major system resources that can be licensed are processors and memory. These two resources are representative of the wide array of system resources that can be licensed depending on the specific needs of the customer and system vendor. As noted, the command processor is adapted to limit the flow of data and commands to and from processing resources that are not properly licensed. This, in effect, cuts off usage of the resources at a command level.

A Processors Licensed field 430 holds a value indicating the maximum number of processors that can be used by the proxy cache server. This limit applies only to the proxy cache server itself, while add-on products are licensed separately. In one embodiment, the field is additive among licenses such that, for example, if two licenses, each licensing the use of only one processor, are issued upon a multiprocessor server, then two processors on that server may be used. In an alternate embodiment, the value of the Processors Licensed field 430 may not be additive, but rather serve as a maximum number of processors to be used on the server. In this case the value of the Processors Licensed field 430 of each license is inspected, and the largest value becomes the maximum number of processors licensed for use by any and all functions on the server.

A Processors Licensed to Use field 435 holds a value indicating the maximum number of processors that can be used by a specific add-on process to the basic proxy cache server. While the server in general may be licensed by the Processors Licensed field 430 to use some "n" processors, a given function of the server may be licensed by the Processors Licensed to Use field 435 to use some 'm' processors. For example, the server may be licensed to use four (n=4) processors, while a secure proxy cache process may be licensed for only two (m=2). In this case, the license for the secure proxy cache process restricts the number of processors to be used to be less than what the server is licensed for. In the reverse case, the server may be licensed to use two processors, whereas the secure proxy cache process is licensed to use four. In this case, the license for the secure proxy cache process exceeds the number of processors that the overall server is licensed for, and thus, the secure proxy is limited to two processors by the overall server processor limit.

Similar to the Processors Licensed field 430, a Memory Licensed field 440 provides a mechanism for licensing the maximum amount of memory to be used by the proxy cache server. The license serves to represent the upper limit of memory usage allowed by any and all processes of the server. In one embodiment, this field is additive between licenses. For example, if two licenses are present on a server, each licensing one gigabyte of memory, then a total of two gigabytes of memory may be used by the server. In an alternate embodiment, this field serves as a maximum limit, such that the license with the greatest value in the Memory Licensed field 440 limits memory usage by all processes on the server to that value.

Similar to the Processors Licensed to Use 435 field, a Memory Licensed to Use field 445 provides a limit on the memory that can be used by a specific add-on process of the basic proxy cache server. While the server may be licensed by the Memory Licensed field 440 to use some "n" amount of memory, any given function of the server may be licensed to use some 'm' amount of memory. For example, the server may be licensed to use four (n=4) gigabytes while a secure proxy cache process may be licensed for only two (m=2) gigabytes. In this case, the license for the secure proxy cache process restricts the amount of memory to be used to be less than that for which the overall server is licensed. In the reverse case, the server may be licensed to use two gigabytes whereas the secure proxy cache process is licensed to use four gigabytes of memory. Here, the license for the secure proxy cache process exceeds the amount of memory the overall server is licensed for, and thus will be limited to two gigabytes by the Memory Licensed field 440.

A License Expiration field 450 holds a date value on which the license will expire. Expiration dates are generally used with beta licenses, demonstration licenses, and testing licenses. If no date is indicated then the license may never expire.

A License Serial Number Body field 455 contains the serial number or numbers that are valid for this license. This field consists of a number of sub-fields that can be used in various combinations to implement a variety of serial number schemes. A variety of serial number scheme options are desirable to compliment different license types and different consumer uses. One sub-field is the Appliance Serial Number field 456. It contains a list of server or other hardware serial numbers that are licensed to use the proxy cache package. It is noted that the serial number may be embedded in a separate but associated piece of hardware relative to the server (e.g. a NIC MAC). Server/hardware serial numbers are unique to each server and stored in a non-volatile manner on a storage device internal to the server. Only servers with serial numbers on the list in the Appliance Serial Number sub-field 456 will validate the licenses. Further, a Testing License sub-field 457 may contain a serial number corresponding to a number entered by a testing technician into the server. This allows a testing technician to install the proxy cache software on a number of machines without validating the serial number of each machine. Additionally, an Appliance MAC Number sub-field 458 may contain a list of Media Access Control (MAC) addresses corresponding to network interface cards (NICs) in the server. A match between the sub-field and any resident NIC MAC address validates the license for use on that server. In yet another sub-field, termed the Appliance Paper License Number sub-field 459, a serial number, corresponding to a serial number on a paper license given to a customer, may be stored. In one embodiment, the customer is instructed to enter a number into the server from a paper license shipped to him. The entered number is compared to the value in the Appliance Paper License Number field 459, and if there is a match, the license is validated.

A Commands to Register field 470 contains numerous sub-fields indicating commands that may be registered with the command line interface (CLI). Commands that may be registered include (but are not limited to):

```
set eth1 address = 10.1.1.1 subnetmask = 255.255.255.0
set forward enable = yes
set transparent enable = no
```

The present invention uses these commands and the Commands to Register field 470 to implement a novel license enforcement mechanism. Each module or process in a proxy cache server uses a distinct set of commands to perform basic functions. As product modules register commands through the CLI, the CLI inspects the licenses to see if each command is allowed. Disallowed commands are not registered. If a command is not registered, it may not be executed, and thus product modules that use the command will not be accessible on the server. Some exemplary XML-based statements for causing the CLI to register various commands are now described in greater detail.

For example, the XML statement:

```
<CommandsToRegister>
    <Command>accelerator</Command>
    <Inclusion>include<Inclusion>
</CommandsToRegister>
``` causes the CLI to register, and therefore allow, all commands that start with the keyword "accelerator."

Similarly, the XML statement:

```
<CommandsToRegister>
    <Command>accelerator %param%</Command>
    <Inclusion>include<Inclusion>
<CommandsToRegister>
``` causes the CLI to register and therefore allow all commands that start with the keyword "accelerator" and followed by any parameter of any type (alpha, numeric, alphanumeric).

However, the XML statement:

```
<CommandsToRegister>
    <Command>accelerator %param% securex</Command>
    <Inclusion>exclude</Inclusion>
</CommandsToRegister>
``` excludes all CLI commands with a third parameter of "securex," whereas

```
<CommandsToRegister>
    <Command>accelerator %param% accesscontrol</Command>
    <Inclusion>include<Inclusion>
</CommandsToRegister>
``` includes a third parameter of "accesscontrol." Note that the above exemplary statements are merely an example of the wide variety of commands that may be registered according to this invention. The particular identifying information for parameters, commands, and the like, is also subject to variation.

In this manner, licenses are enforced at a very low level, without product code modifications. It is desirable to enforce licenses without modifying the product code since such a licensing system can easily be extended to cover new products, new product add-ons, or third party products without alteration of their native program code.

The Commands to Register field 470 contains two types of sub-fields. The first type, a Command sub-field 472, specifies with a text string the command in question. The second type, an Inclusion sub-field 474, specifies with a text string whether to to include or exclude the command from the set of those that will be registered. In this embodiment, if a command is not specified to be included or excluded, the default case is to be excluded. Nonetheless, an explicit exclude field is highly desirable. Exclusion of a command does not mean that the command is excluded from all command registration, rather, it means that the command is excluded from the list of valid commands for that license only. A given server may support multiple licenses, and these various licenses may provide for registration of different levels of commands or sets of commands, whereby some licenses on a given server exclude a command, while other licenses allow the same command. This mechanism can be well employed for commands that share a root command (i.e. commands that have associated sub-commands). Thus, to quickly register a number of commands, a license can include a root command and exclude a small number of sub-commands that are not licensed.

Figure 5:
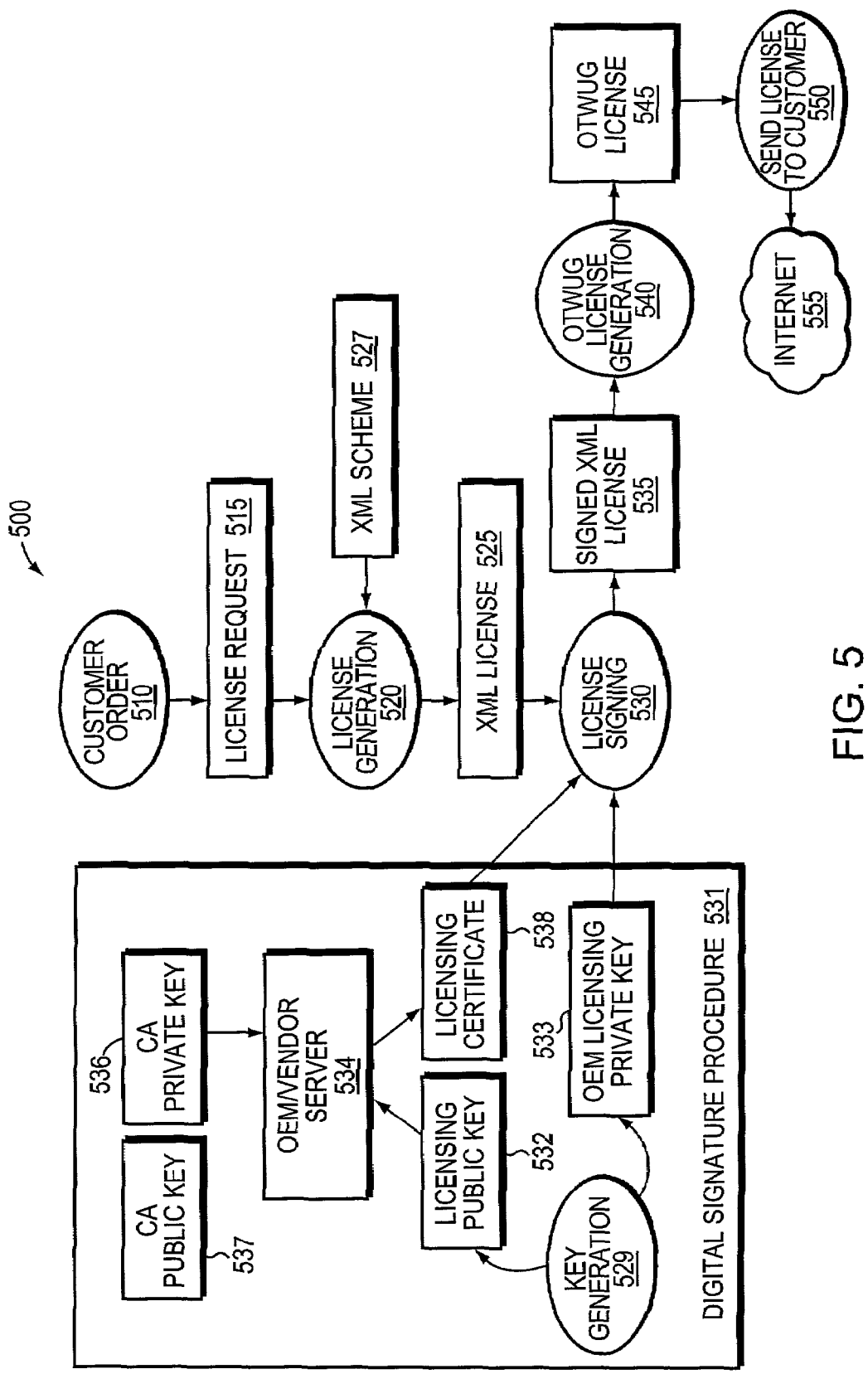
FIG. 5 is a flow diagram depicting a procedure implemented to send an over-the-wire license or license upgrade to a customer according to an embodiment of this invention.

FIG. 5 is a flow diagram depicting a procedure 500 implemented to send an over-the-wire license or license upgrade (OTWUG) to a customer. A network-based mechanism for license installation is generally desirable, though a license or license upgrade may be installed directly by the manufacturer, or an OEM, in their production facility, or by an onsite service representative. By way of illustration, a network-based process begins with a license request (step 515) where the manufacturer, or one of its resellers, receives a customer order 510 for a new license or a license upgrade. Next follows license generation (step 520), where a license 525 conforming to the customer's order is generated by formatting the required data in accordance with a license XML schema 527. The schema formats the license information into the arrangement of fields, as described in FIG. 4, and validates the information as conforming to the established data-type parameters. The finished XML license 525 then proceeds to license signing (step 530) in which a digital signature procedure 531 is employed to secure the license integrity and prevent unauthorized modification.

Briefly, the digital signature procedure 531 includes the generation (by a conventional key generation process 529) of a licensing public key 532 and OEM licensing private key 533. The OEM/vendor server 534 combines that licensing public key with a certificate authority (CA) private key 536. The certificate authority is a trusted entity. There is an associated CA public key 537 that is made available via the entity's web site or other delivery mechanism. The server 534 uses the private key to generate a licensing certificate 538 that includes the licensing public key 532. The licensing private key 533 is used by the license signing process 530 to generate the signed license. This signed license is authenticated on the customer end using the licensing public key 529 that is sent along in the certificate (which is appended to the signed license during the signing process), as described further below.

The signed XML License 535 is then used to generate the Over-the-Wire-License-Upgrade (OTWUG) message (step 540). The OTWUG message 545, which includes additional information to facilitate transmittal of the license over an inter-network, is transmitted to the customer 550 over the Internet 555, or another appropriate network connection.

Figure 6:
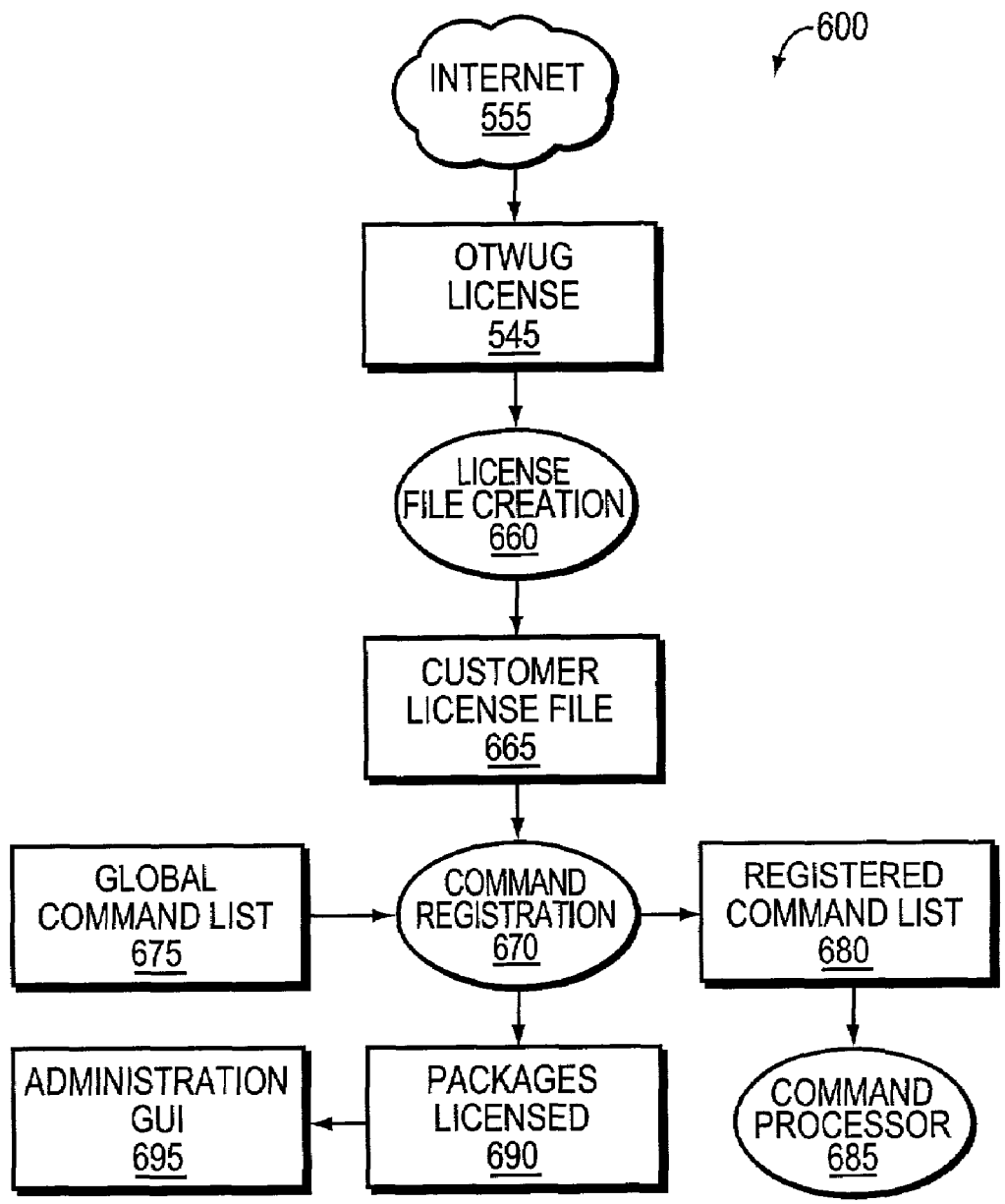
FIG. 6 is a flow diagram depicting a procedure for processing the license or the license upgrade of FIG. 5 and unlocking associated hardware and software functions on the customer's server.

FIG. 6 is a flow diagram depicting a customer-based procedure to process a received license or license upgrade, and unlock desired hardware and software functions as applicable. The customer receives the OTWUG License 545 over the Internet 555. The OTWUG License 545 is reformatted, in part stripping the information added to facilitate license transmittal over the Internet, in a license file creation step (step 660). This customer license file 655 is used in a process of command registration (step 670), detailed below, where a list of included commands is extracted from the customer license. Only commands included in the license file, a subset of the global command list 675, are registered. If a command is not registered, it may not be executed, and thus is product modules that use the command will not be accessible on the server. A complete list of registered commands 680 is securely transmitted to the command processor 685. Note that, according to one illustrative embodiment, the command processor 685 may be incorporated as part the command registration process. Further, a summary of packages licensed 690 is transmitted to an administration graphical user interface (GUI) 695 for display to the customer. This GUI provides the customer with information on the current state of their licenses and a summary of what hardware and software functions are available on the server in a desired display format.

Figure 7:
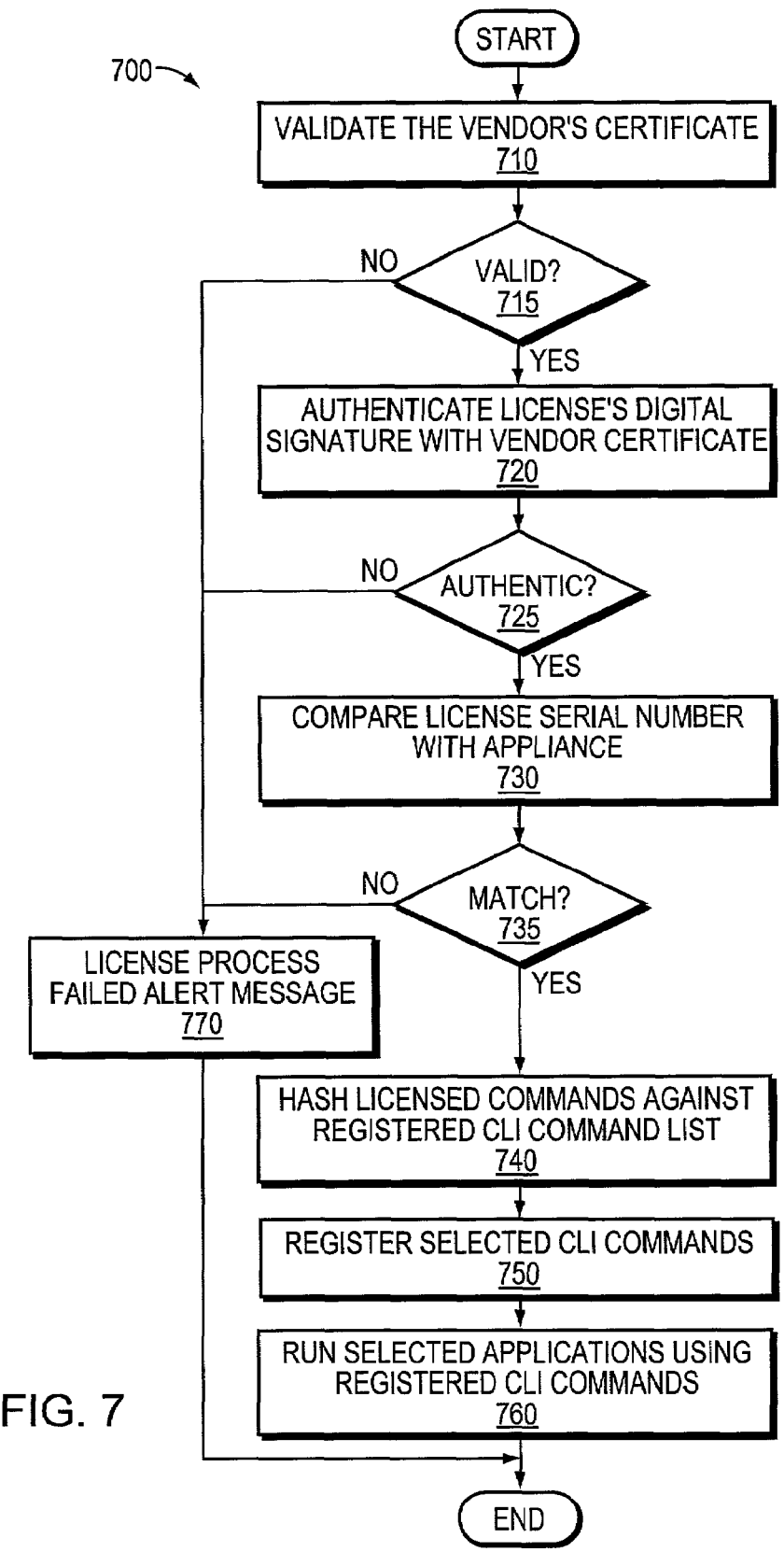
FIG. 7 is a flow diagram detailing a procedure for license authentication and command registration on the customer's server.

FIG. 7 is a flow diagram detailing the procedure 700 of license authentication and command registration according to an illustrative embodiment of this invention. First, the vendor certificate included in the OTWUG license package is validated (step 710) to ensure certificate integrity. This entails the use of a copy of the CA public key 537 (FIG. 5) obtained through a variety of sources. If the vendor certificate is valid (decision step 715), the validating licensee/customer obtains the licensing public key 532 from the certificate 538. The licensing public key is then used to authenticate the license's digital signature (step 720). In this step, the server uses the licensing public key previously generated from the licensing certificate (which was sent in the OTWUG license package). This authentication is performed via well-known digital signature techniques. If the license's digital signature is verified as authentic, then the customer is ensured that the license has not been altered, and that it has been sent by specified sender.

For an authentic license (decision step 725), an embodiment of the present invention may further require a serial number in the license to be compared (step 730) to either a serial number stored internal to server, or a number entered by the customer from a paper license. Once this is done, the licensed commands are read by the server and hashed against a list of registered CLI commands (step 740). According to one embodiment, this list is created as commands are registered, and the comparison is performed to prevent the placing of a given command in the command processor table more than once. CLI commands included in the license are then registered (step 750), wherein they can be executed by the command processor in the server when program code calls for the specific command. Unregistered commands will not be executed, rendering program code that required their implementation to be inoperative. Finally, the customer may run licensed applications and add-ons (step 760) at will. If at any point in the license authentication and command registration process, a certificate proves invalid (decision step 715), a digital signature fails to authenticate (decision step 725), or a serial number does not match (decision step 735), then the processing of the subject license is aborted (while other valid licenses may continue to be processed normally), and an alert message, that may be displayed by a GUI, informs the customer the subject license has failed to process properly and has been excluded from the operational characteristics of the processing appliance (step 770). Accordingly, any invalid licenses are noted as such and the appliance may continue operation in a valid mode with valid licenses. In addition, other alert sinks may also be implicated, including alert logging implementations, Simple Network Management Protocol (SNMP) alerts, various network operations center alert-management arrangements.

The foregoing description has been directed to various embodiments of this invention. It will be apparent, however, that variations and modifications may be made to the described embodiments for the attainment of some or all of their advantages. For example, the license securing process may employ other mechanisms than the described digital signature procedures, including various encryption algorithms that act upon data transmitted from the vendor. In addition the arrangements of servers and associated network components are highly variable. As noted generally above, the upgrade and update procedures described herein can be made using removable media (such as CD-ROMs delivered from a vendor to a customer with applicable licensed/encoded data) rather than over a network connection, and the term network should be taken broadly to include such transfer of data. Finally a variety of network-implementations can be employed between the vendor and customer, including virtual private networks, wireless interconnections, direct links, and the like. Accordingly, this description is meant to be taken only by way of example, and not to otherwise limit the scope of the invention.

What is claimed is:

1. A method for licensing external processes on a server comprising the steps of:

generating an electronic license, wherein the electronic license is generated by formatting a customer order for a software product in accordance with a licensing schema and the formatted electronic license to include a plurality of software command directives embedded within the formatted electronic license to indicate whether a particular software command directive associated with a particular feature of the software product is to be accepted for registration or rejected for registration, and wherein each software command directive includes a command name associated with a particular software command or operation of the software product and an inclusion or exclusion identifier for indicating the acceptance or rejection of registration for that particular software command or operation within the software product, and wherein at least one software command for the software product is associated with the exclusion identifier; and registering selective ones of the software commands in response to the software command directives and their inclusion and exclusion identifiers; and executing the registered commands.

2. The method as set forth in claim 1 wherein the step of includes directing the software product to only use a set of licensed hardware resources, the set of licensed hardware resources also being defined by one or more fields in the electronic license.

3. The method as set forth in claim 1 wherein the step of generating includes generating a license upgrade, the license upgrade defining a set of additional commands for registration that are not part of software commands registered in conjunction with one or more prior licenses.

4. The method as set forth in claim 1 wherein the step of generating includes generating a license upgrade, the license upgrade describing additional hardware resources licensed for use by the software product that are not part of hardware resources licensed for use by prior licenses.

5. The method as set forth in claim 1 wherein the step of generating includes generating a license upgrade, the license upgrade describing additional hardware resources licensed for use by the software product that add further capabilities to hardware resources licensed for use by prior licenses.

6. The method as set forth in claim 1 further comprising either one of (a) installing the electronic license in the server prior to shipment of the server to an end-user of the server and (b) providing the electronic license to the end-user on a removable media for installation in the server after the shipment of the server to the end-user.

7. The method as set forth in claim 1 further comprising installing the electronic license in the server in a over-the-wire process including (a) digitally signing the electronic license by a vendor, (b) transmitting the digitally signed electronic license over a communications network from the vendor to the server, (c) validating the digitally signed electronic license by the server and (d) installing the validated electronic license in the server.

\* \* \* \* \*